US012468423B2

(12) United States Patent
Lin

(10) Patent No.: US 12,468,423 B2
(45) Date of Patent: Nov. 11, 2025

(54) METHOD FOR MANAGING ANTI-ACCIDENTAL TOUCH FUNCTION AND ELECTRONIC DEVICE

(71) Applicant: ASUSTeK COMPUTER INC., Taipei (TW)

(72) Inventor: Wun-Yu Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/963,564

(22) Filed: Nov. 28, 2024

(65) Prior Publication Data

US 2025/0238099 A1 Jul. 24, 2025

(30) Foreign Application Priority Data

Jan. 23, 2024 (TW) ................. 113102559

(51) Int. Cl.
*G06F 3/041* (2006.01)
*G06V 40/13* (2022.01)

(52) U.S. Cl.
CPC .. *G06F 3/0418* (2013.01); *G06F 2203/04108* (2013.01); *G06V 40/1312* (2022.01)

(58) Field of Classification Search
CPC ........ G06F 3/0418; G06F 2203/04108; G06V 40/1312
See application file for complete search history.

(56) References Cited

U.S. PATENT DOCUMENTS

2024/0291918 A1* 8/2024 Di .................... G06F 3/0412

FOREIGN PATENT DOCUMENTS

| CN | 106682537 | 5/2017 | |
| --- | --- | --- | --- |
| CN | 108804005 | 11/2018 | |
| CN | 113721781 | 11/2021 | |
| CN | 114995676 | 9/2022 | |
| CN | 116204075 | 6/2023 | |
| EP | 4212999 | 7/2023 | |
| WO | WO-2022022609 A1 * | 2/2022 | ............ H04M 1/026 |

OTHER PUBLICATIONS

Machine translation for WO 2022022609 (Year: 2025).*
Coreyi, "Touch Lock is a screen antiaccidental touch program that can "lock physical buttons" at the same time", Retrieved on Dec. 12, 2018, with English translation thereof, Available at: https://web.archive.org/web/20190510210032/https://briian.com/56233/2/.

* cited by examiner

*Primary Examiner* — Michael Pervan
(74) *Attorney, Agent, or Firm* — JCIPRNET

(57) ABSTRACT

A method for managing an anti-accidental touch function and an electronic device are provided. The method includes: providing an accidental touch management interface, in which the anti-accidental touch management interface includes an anti-accidental touch management item and a plurality of anti-accidental touch items; when a touch panel of the electronic device is in a locked state, determining whether the anti-accidental touch management item is enabled; and in response to determining that the anti-accidental touch management item is enabled, performing a first anti-accidental touch function corresponding to an enabled first anti-accidental touch item among the plurality of anti-accidental touch items on the touch panel.

7 Claims, 3 Drawing Sheets

METHOD FOR MANAGING ANTI-ACCIDENTAL TOUCH FUNCTION AND ELECTRONIC DEVICE

CROSS-REFERENCE TO RELATED APPLICATION

This application claims the priority benefit of Taiwan application serial no. 113102559, filed on Jan. 23, 2024. The entirety of the above-mentioned patent application is hereby incorporated by reference herein and made a part of this specification.

BACKGROUND

Technical Field

The disclosure relates to a method for managing an anti-accidental touch function and an electronic device.

Description of Related Art

When the phone is in sleep mode and is put in your pocket, and there are new messages or incoming calls that cause the screen to light up, some unexpected touch behaviors may often occur. This is because the screen can be easily touched by surrounding objects in the pocket to cause unexpected triggering. For example, the switch in Quick settings may be accidentally touched, causing the phone to turn on airplane mode, or the shortcut on the lock screen may be accidentally touched, causing the camera to activate. In such a situation, unnecessary power consumption may occur. In addition, when the WIFI or mobile data switch is accidentally turned on/off, it may also cause the connection to be interrupted and/or cause related functions to fail.

In addition, hardware limitations of proximity sensors may result in the inability to cover anti-accidental touch scenes of all pockets. For example, for shallow or specially shaped pockets, it may not be sufficient to trigger the proximity sensor on the phone by simply placing the phone in the pocket, thereby making it difficult for the system to determine whether the phone is in a safe sleep state.

SUMMARY

The disclosure provides a method for managing an anti-accidental touch function, adapted for an electronic device including a touch panel, including the following steps. An anti-accidental touch management interface is provided, in which the anti-accidental touch management interface includes an anti-accidental touch management item and a plurality of anti-accidental touch items. When the touch panel is in a locked state, it is determined whether the anti-accidental touch management item is enabled. When it is determined that the anti-accidental touch management item is enabled, at least one first anti-accidental touch function corresponding to at least one enabled first anti-accidental touch item among the plurality of anti-accidental touch items is performed on the touch panel.

The disclosure also provides an electronic device, including a storage circuit, a touch panel, and a processor. The storage circuit stores a program code. The processor is coupled to the storage circuit and the touch panel, and accesses the program code to: provide an anti-accidental touch management interface, in which the anti-accidental touch management interface includes an anti-accidental touch management item and a plurality of anti-accidental touch items; when the touch panel is in a locked state, determine whether the anti-accidental touch management item is enabled; and when it is determined that the anti-accidental touch management item is enabled, perform at least one first anti-accidental touch function corresponding to at least one enabled first anti-accidental touch item among the plurality of anti-accidental touch items on the touch panel.

DESCRIPTION OF THE EMBODIMENTS

Figure 1:
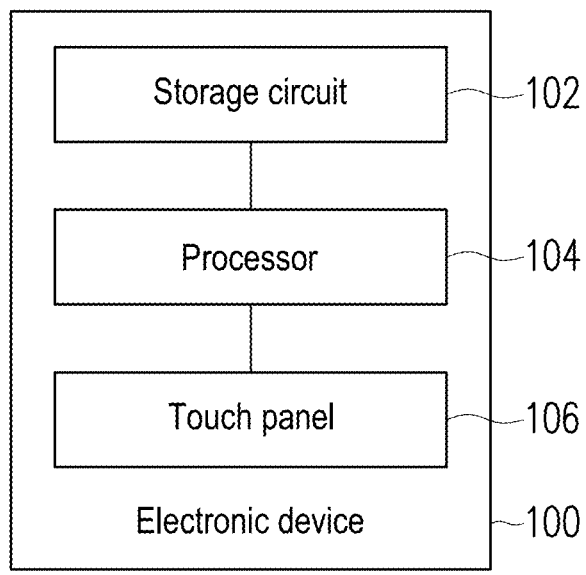
FIG. 1 is a schematic diagram of an electronic device according to an embodiment of the disclosure.

Please refer to FIG. 1. FIG. 1 is a schematic diagram of an electronic device according to an embodiment of the disclosure. In different embodiments, an electronic device 100 may be implemented as various smart devices and/or computer devices, but the disclosure is not limited thereto.

In FIG. 1, the electronic device 100 includes a storage circuit 102, a touch panel 106, and a processor 104.

The storage circuit 102 is, for example, any form of fixed or movable random access memory (RAM), a read-only memory (ROM), a flash memory, a hardware disc, or other similar devices, or a combination thereof, which may be configured to record a plurality of codes or modules.

The processor 104 is coupled to the storage circuit 102 and can be a general purpose processor, a special purpose processor, a conventional processor, a digital signal processor, a plurality of microprocessors, one or more microprocessors combined with digital signal processor cores, a controller, a microcontroller, an application specific integrated circuit (ASIC), a field programmable gate array (FPGA), any other type of integrated circuit, state machine, advanced RISC machine (ARM), and the like.

In different embodiments, the touch panel 106 is, for example, a touch screen with a display function and/or a pure touch pad without a display function, but the disclosure is not limited thereto.

In an embodiment of the disclosure, the processor 104 can access the modules and program codes recorded in the storage circuit 102 to implement the method for managing the anti-accidental touch function proposed by the disclosure, which will be described in details below.

Figure 2:
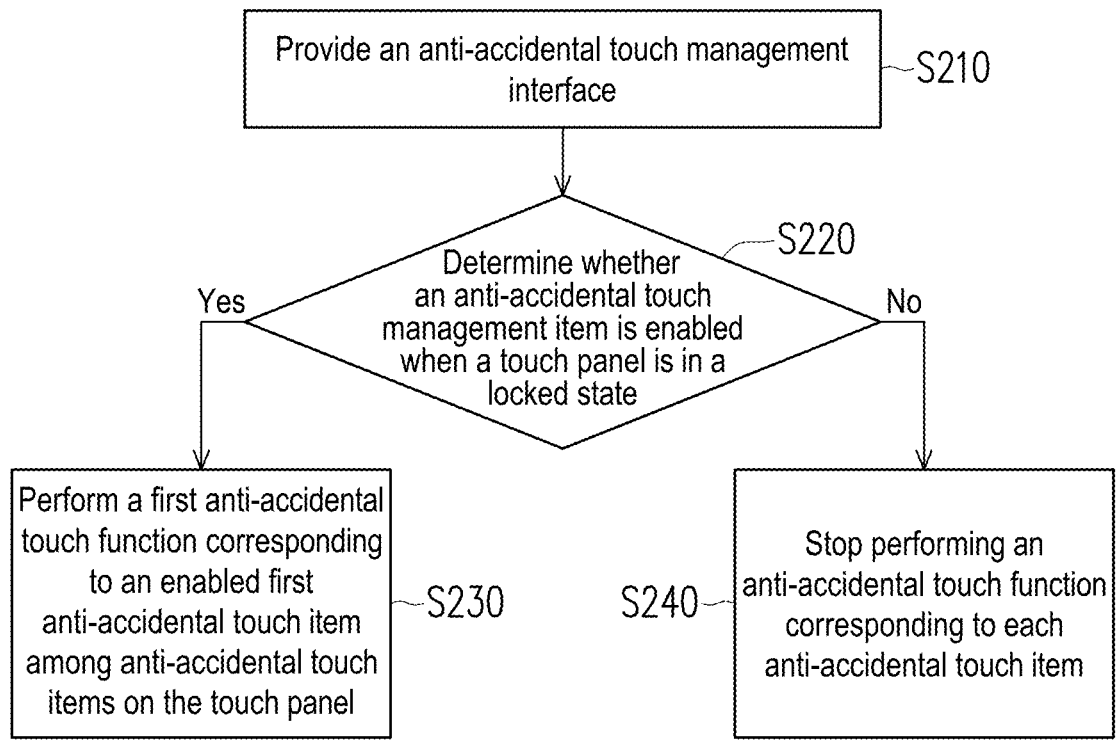
FIG. 2 is a flowchart of a method for managing an anti-accidental touch function according to an embodiment of the disclosure.

Please refer to FIG. 2. FIG. 2 is a flowchart of a method for managing an anti-accidental touch function according to an embodiment of the disclosure. The method of the embodiment can be executed by the electronic device 100 of FIG. 1. The details of each step of FIG. 2 will be described below with reference to the components shown in FIG. 1. In addition, in order to make the concept of the disclosure easier to understand, the following is supplemented by the scenario shown in FIG. 3, in which FIG. 3 is a schematic diagram of an anti-accidental touch management interface according to an embodiment of the disclosure.

First, in step S210, the processor 104 provides an anti-accidental touch management interface 300, in which the anti-accidental touch management interface 300 includes an anti-accidental touch management item 310 and a plurality of anti-accidental touch items 321 to 323.

In the embodiment of the disclosure, the electronic device 100 is, for example, a smart device (such as a mobile phone) running the Android system, and the processor 104 can, for example, provide a button that can be configured to display the anti-accidental touch management interface 300 in the settings interface provided by the Android system. In an embodiment, the processor 104 can also display the anti-accidental touch management interface 300 accordingly when running a specified application. In another embodiment, the processor 104 may also display the anti-accidental touch management interface 300 accordingly when the user inputs a specific gesture or performs a specific operation, but the disclosure is not limited thereto.

Figure 3:
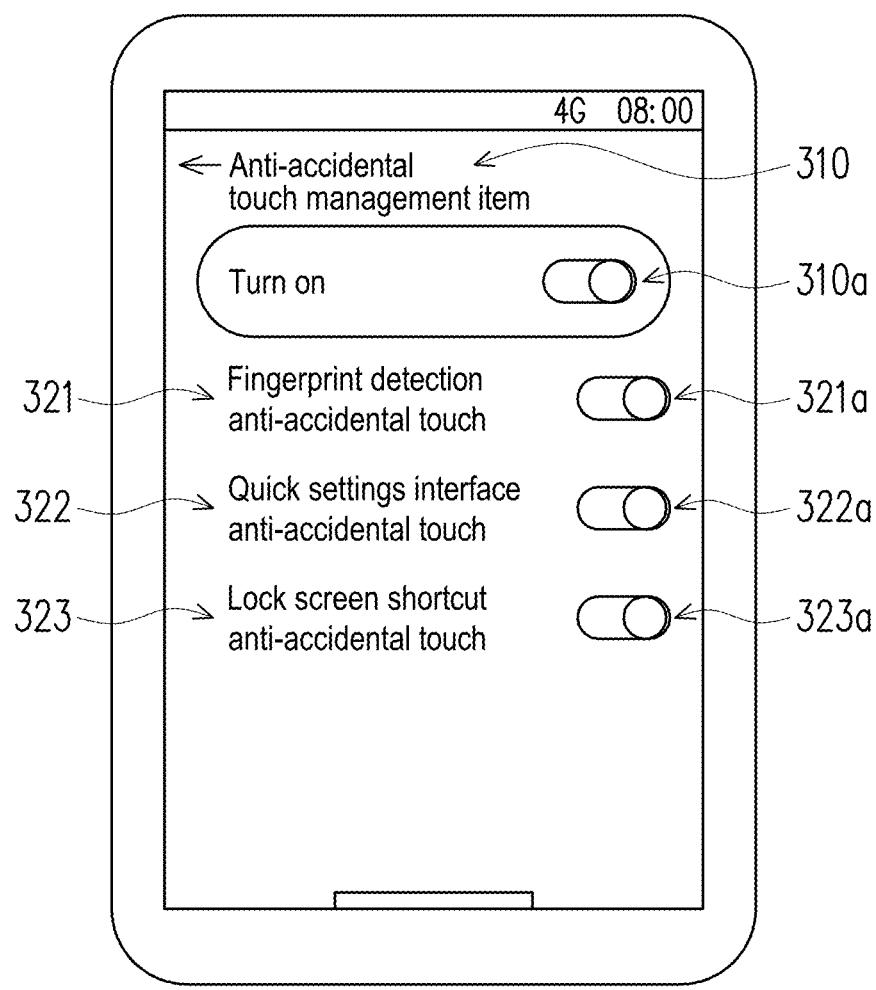
FIG. 3 is a schematic diagram of an anti-accidental touch management interface according to an embodiment of the disclosure.

In FIG. 3, the anti-accidental touch items 321 to 323 may respectively include the quick settings interface anti-accidental touch and the lock screen shortcut anti-accidental touch. In other embodiments, designers can adjust the appearance of each anti-accidental touch item in the anti-accidental touch management interface 300 according to requirements. For example, the anti-accidental touch management interface 300 may be designed to include at least one of the quick settings interface anti-accidental touch, the lock screen shortcut anti-accidental touch, and the fingerprint detection anti-accidental touch, or include other more/less anti-accidental touch items, but the disclosure is not limited thereto.

In addition, the anti-accidental touch management interface 300 may include a main toggle switch 310a corresponding to the anti-accidental touch management item 310 and a plurality of sub-toggle switches 321a to 323a respectively corresponding to the anti-accidental touch items 321 to 323.

In the embodiment of the disclosure, the user can enable/disable the anti-accidental touch management item 310 by touching the main toggle switch 310a, and enable/disable the corresponding anti-accidental touch items 321 to 323 by touching the sub-toggle switches 321a to 323a.

In the disclosure, the processor 104 may determine that the anti-accidental touch management item 310 is enabled (or disabled) by determining that the main toggle switch 310a is enabled (or disabled). Similarly, when determining that one or more of the sub-toggle switches 321a to 323a are enabled, the processor 104 may determine that the corresponding one or more of the anti-accidental touch items 321 to 323 are enabled, but the disclosure is not limited thereto.

In FIG. 3, the scenario shown is, for example, a scenario in which the sub-toggle switches 321a to 323a are all enabled (that is, the anti-accidental touch items 321 to 323 are all enabled). In other embodiments, the user can also enable only a part of the anti-accidental touch items 321 to 323 according to his or her own requirements.

For example, if the user only needs to prevent the anti-accidental touches for fingerprint detection and quick settings interface, the user only needs to enable the anti-accidental touch items 321 and 322 by enabling the sub-toggle switches 321a and 322a, but the disclosure is not limited thereto.

In an embodiment of the disclosure, the user can, for example, press the power button of the electronic device 100 and/or idle the electronic device 100 for a specified period of time to enter the locked state of the touch panel 106 of the electronic device 100, but the disclosure is not limited thereto.

After the touch panel 106 enters the locked state, the processor 104 may, for example, perform the corresponding anti-accidental touch function based on the individual enabling conditions of the anti-accidental touch management item 310 and the anti-accidental touch items 321 to 323.

Based on this, in step S220, when the touch panel 106 is in the locked state, the processor 104 determines whether the anti-accidental touch management item 310 is enabled.

In an embodiment, when the processor 104 determines that the anti-accidental touch management item 310 is enabled (for example, the main toggle switch 310a is enabled), the processor 104 performs step S230 accordingly. On the other hand, when it is determined that the anti-accidental touch management item 310 is not enabled (for example, the main toggle switch 310a is disabled), the processor 104 may perform step S240 accordingly.

In step S230, the processor 104 performs the first anti-accidental touch function corresponding to the enabled first anti-accidental touch item among the anti-accidental touch items 321 to 323 on the touch panel 106.

For example, assuming that the anti-accidental touch items 321 to 323 are all enabled as shown in FIG. 3, the processor 104 can perform the anti-accidental touch function corresponding to the anti-accidental touch items 321 to 323 on the touch panel 106 when executing step S230.

In the disclosure, when the processor 104 determines that a touch input performed on the quick settings interface of the Android system occurs, the processor 104 may ignore the touch input accordingly. In addition, when the processor 104 determines that a touch input performed on the lock screen shortcut occurs, the processor 104 can also ignore the touch input accordingly. Similarly, when the processor 104 determines that the fingerprint recognition module detects a touch input, the processor 104 may ignore the touch input accordingly.

In an embodiment in which the electronic device 100 includes a proximity sensor, when it is determined that the fingerprint recognition module of the electronic device 100 detects a touch input, the processor 104 may also determine whether the proximity sensor of the electronic device 100 detects an object. When it is determined that the proximity sensor detects an object, it means that the electronic device 100 may be in a pocket (or a similar scene), so the processor 104 can ignore the touch input accordingly to avoid accidental touches. On the other hand, when it is determined that the proximity sensor does not detect an object, it means that the electronic device 100 should not be in a pocket, so the touch input should not be an accidental touch. In the disclosure, the processor 104 can perform a fingerprint recognition operation on the touch input accordingly to determine whether to unlock the electronic device 100 and/or the touch panel 106, but the disclosure is not limited thereto.

In addition, assuming that only a part of the anti-accidental touch items 321 to 323 is enabled, the processor 104 may regard the enabled anti-accidental touch items as the first anti-accidental touch item and perform the corresponding first anti-accidental touch function on the touch panel 106.

In addition, in step S240 (that is, when the anti-accidental touch management item 310 is not enabled), the processor 104 stops performing the anti-accidental touch function corresponding to each of the anti-accidental touch items 321 to 323.

That is, when the anti-accidental touch management item 310 is enabled, the processor 104 can perform the anti-accidental touch function corresponding to the enabled anti-accidental touch item when the touch panel 106 is locked. However, when the anti-accidental touch management item 310 is disabled, the processor 104 will not perform any anti-accidental touch function corresponding to the anti-accidental touch item when the touch panel 106 is locked (regardless of whether each of the anti-accidental touch items 321 to 323 is enabled).

In an embodiment, the processor 104 may determine whether a trigger gesture is detected. In an embodiment, if the processor 104 detects the trigger gesture when the anti-accidental touch management item 310 is enabled, the processor 104 may switch the enabled anti-accidental touch management item 310 to be disabled. For example, the processor 104 may switch the main toggle switch 310a of the anti-accidental touch management item 310 to be disabled, so as to disable the anti-accidental touch management item 310.

In addition, if the processor 104 detects a trigger gesture when the anti-accidental touch management item 310 is disabled, the processor 104 may switch the disabled anti-accidental touch management item 310 to be enabled. For example, the processor 104 can switch the main toggle switch 310a of the anti-accidental touch management item 310 to be enabled, so as to enable the anti-accidental touch management item 310.

In different embodiments, the processor 104 can detect the trigger gesture when the touch panel 106 is in a locked state and/or an unlocked state, but the disclosure is not limited thereto.

In some embodiments, the trigger gesture is, for example, a certain combination of various inputs performed by the user on the physical buttons of the electronic device 100 and/or the touch panel 106. For example, assuming that the trigger gesture is designed to press the power button of the electronic device 100 two times in a row, when the processor 104 determines that the power button of the electronic device 100 is detected to be pressed two times in a row, it can be determined that the trigger gesture is detected.

For another example, assuming that the trigger gesture is designed to touch the touch panel 106 three times in a row, when the processor 104 determines that the touch panel 106 is detected to be touched three times in a row, it can be determined that the trigger gesture is detected, but the disclosure is not limited thereto.

In other embodiments, the trigger gesture for disabling the anti-accidental touch management item 310 and the trigger gesture for enabling the anti-accidental touch management item 310 may be the same or different.

Figure 4:
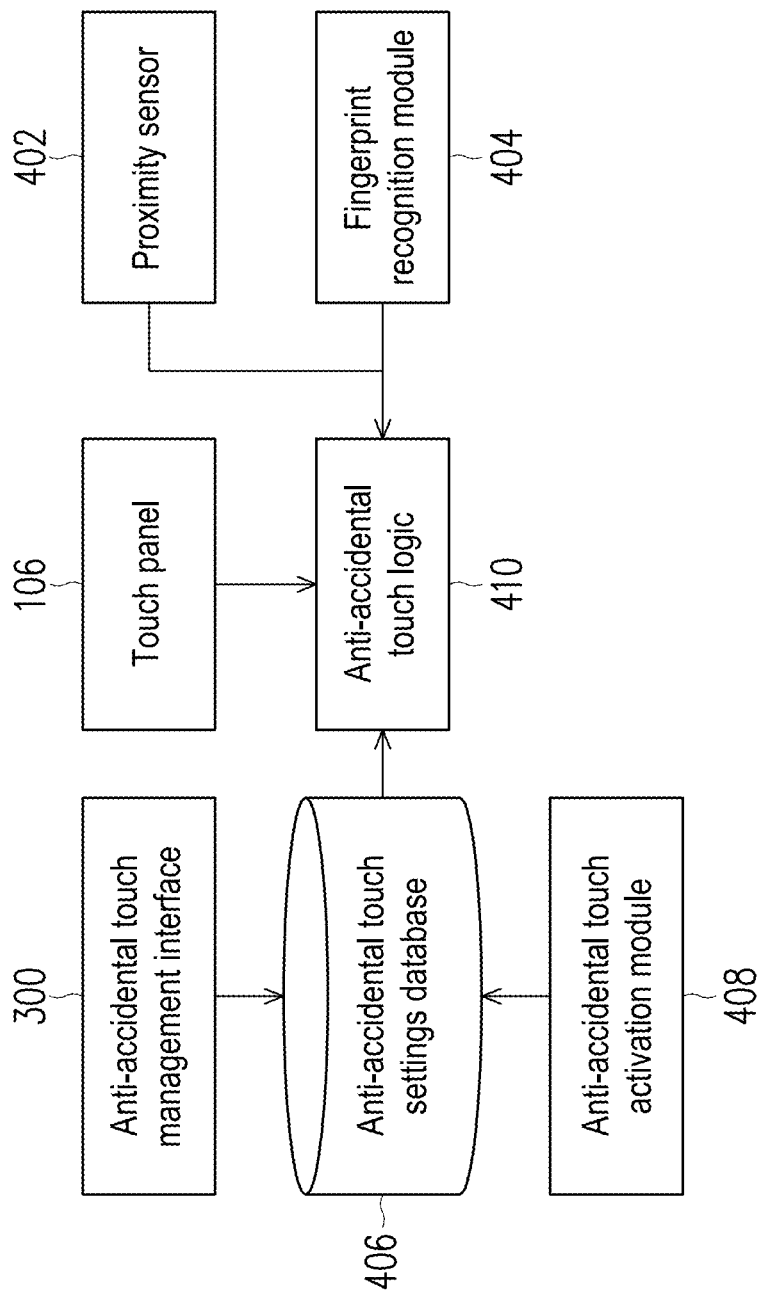
FIG. 4 is a schematic diagram of an operation logic according to an embodiment of the disclosure.

Please refer to FIG. 4. FIG. 4 is a schematic diagram of an operation logic according to an embodiment of the disclosure. In FIG. 4, after each of the anti-accidental touch items 321 to 323 in the anti-accidental touch management interface 300 is individually enabled or disabled, the relevant settings can be stored in an anti-accidental touch settings database 406. In addition, an anti-accidental touch activation module 408 may, for example, provide a corresponding trigger signal in response to whether the trigger gesture is detected. For example, when it is determined that a trigger gesture for enabling the anti-accidental touch management item 310 is detected, the anti-accidental touch activation module 408 may request the anti-accidental touch settings database 406 to store the relevant data of each anti-accidental touch item 321 to 323 (such as whether it is enabled) to the processor 104, so that the processor 104 runs an anti-accidental touch logic 410 accordingly.

In an embodiment, the processor 104 may refer to the information mentioned in the touch panel 106, a proximity sensor 402, and/or a fingerprint recognition module 404 to run the anti-accidental touch logic 410 to implement step S230. For relevant details, reference may be made to the descriptions in the previous embodiments and thus will not be repeated herein.

In summary, the method proposed by the disclosure can provide the anti-accidental touch management interface to allow the users to select one or more items that is desired to be enabled from the plurality of anti-accidental touch items. Moreover, when the touch panel is in a locked state, the method of the embodiment of the disclosure can determine whether to perform the anti-accidental touch function of the one or more enabled anti-accidental touch items based on whether the anti-accidental touch management item in the anti-accidental touch management interface is enabled. In this way, the flexibility and diversity of the anti-accidental touch mechanism can be increased, thereby better preventing accidental touches from occurring.

In addition, the method of the disclosure also allows users to conveniently enable and/or disable the anti-accidental touch management items by inputting trigger gestures.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A method for managing an anti-accidental touch function, adapted for an electronic device with a touch panel, comprising:
    providing an anti-accidental touch management interface, wherein the anti-accidental touch management interface comprises an anti-accidental touch management item and a plurality of anti-accidental touch items;
    when the touch panel is in a locked state, determining whether the anti-accidental touch management item is enabled;
    when it is determined that the anti-accidental touch management item is enabled, performing at least one first anti-accidental touch function corresponding to at least one enabled first anti-accidental touch item among the anti-accidental touch items on the touch panel.

2. The method according to claim 1, further comprising:
    when it is determined that the anti-accidental touch management item is disabled, stopping performing the anti-accidental touch function corresponding to each anti-accidental touch item.

3. The method according to claim 1, further comprising:
    when it is determined that a trigger gesture is detected, switching the enabled anti-accidental touch management item to be disabled, or switching the disabled anti-accidental touch management item to be enabled.

4. The method according to claim 1, wherein the anti-accidental touch items respectively comprise at least one of a quick settings interface anti-accidental touch, a lock screen shortcut anti-accidental touch, and a fingerprint detection anti-accidental touch.

5. The method according to claim 1, wherein the at least one first anti-accidental touch item comprises a fingerprint detection anti-accidental touch, and the step of performing the at least one first anti-accidental touch function corresponding to the at least one first anti-accidental touch item comprises:
    when it is determined that the fingerprint recognition module of the electronic device detects a touch input, determining whether a proximity sensor of the electronic device detects an object;

when it is determined that the proximity sensor detects the object, ignoring the touch input;

when it is determined that the proximity sensor does not detect the object, performing a fingerprint recognition operation on the touch input.

6. The method according to claim 1, wherein the anti-accidental touch management interface comprises a main toggle switch corresponding to the anti-accidental touch management item and a plurality of sub-toggle switches respectively corresponding to the anti-accidental touch items, switch, and the method further comprises:

when it is determined that the main toggle switch is enabled, determining that the anti-accidental touch management item is enabled; and when it is determined that one or more of the sub-toggle switches are enabled, determining that the corresponding one or more of the anti-accidental touch items are enabled.

7. An electronic device, comprising:
a non-transitory storage circuit, configured to store a program code;
a touch panel;
a processor, coupled to the non-transitory storage circuit and the touch panel, and configured to access the program code to:
  provide an anti-accidental touch management interface, wherein the anti-accidental touch management interface comprises an anti-accidental touch management item and a plurality of anti-accidental touch items;
  when the touch panel is in a locked state, determine whether the anti-accidental touch management item is enabled; and
  when it is determined that the anti-accidental touch management item is enabled, perform at least one first anti-accidental touch function corresponding to at least one enabled first anti-accidental touch item among the anti-accidental touch items on the touch panel.

* * * * *